Patented Aug. 31, 1926.

1,597,797

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

METHOD OF OXIDIZING HEAVY HYDROCARBONS.

No Drawing.  Application filed December 8, 1921.  Serial No. 521,033.

In my copending applications, Serial Nos. 272,567; 281,124; 335,940 and 435,355, I have described certain methods and apparatus for preparing intermediate partial oxidation products from hydrocarbons, these products being in the range from alcohols through aldehydes to aldehyde acids. As pointed out in said applications I may prepare these products from any commercial source of aliphatic hydrocarbons, such as petroleum, shale oil, the product from a low temperature distillate of coal tar, etc.

In carrying out the said methods, there is considerable difficulty in the proper vaporizing and treating of heavy hydrocarbons, and I have discovered that I can greatly improve the method by mixing the very heavy hydrocarbons, such as wax distillate, pressure tar, heavy lubricating oil fractions, vaselines, etc., with a lighter hydrocarbon before subjecting them to the partial oxidation method. These heavy hydrocarbons have such high boiling points that I have found it difficult to hold the temperatures of the catalytic layers down within the range which insures proper yields and products of good quality, this range being preferably from 230° to 450° C. Furthermore, if there is a slight drop in temperature before the heavy vapors reach the catalytic screen or screens, there is danger of condensation and clogging of the apparatus. The addition of steam as a diluent aids in overcoming this difficulty, but I may employ the present method either with or without the addition of steam. In this preferred method, the heavy oil or fraction to be oxidized is first mixed with a suitable proportion of a fraction of lower average molecular weight. For example, wax, etc., may be mixed with its own volume of gas oil or the wax may be dissolved in suitable proportions of kerosene or gas oil, using heat, if necessary, to form the solution or mixture.

Such solution or mixture is then vaporized, mixed with a regulated amount of air and passed through a catalytic screen or screens in accordance with the processes set forth in the applications above referred to. I have found that with these mixtures I can sufficiently carry out my low temperature vapor phase oxidation of these heavy hydrocarbons; this being due to the fact that the vaporization takes place at lower temperatures, rendering control of the catalytic temperatures easier; and further, I find that, as noted in my earlier applications, the bodies of higher molecular weight are oxidized preferentially when in vapor phase and in such a mixture. That is, they are oxidized more easily and in larger proportion than the lighter hydrocarbons.

After condensing and recovering the product, the heavier oxidized products may be removed from the mixture by precipitation, distillation or in any other desired manner.

In an experimental run with my triple-screen catalytic apparatus, wax distillate (a very heavy fraction) gave trouble in attempting to vaporize it alone and pass the vapor through the catalytic screens. The temperature required for vaporization was so high that considerable cracking, formation on tarry products, and clogging of the catalytic material result.

The wax distillate was then mixed with an equal volume of gas oil (a lighter fraction) and vaporized in the usual way and mixed with air under the conditions fully described in my other applications.

In this run, 50% of wax distillate by volume was mixed with 50% of gas oil. The rate of oil feed was 100 cu. cm. per minute, and the rate of water feed 25 cu. cm. per minute. The air fed to the first screen was 2 cu. ft. per minute; the air to the second screen was 1½ cu. ft. per minute; and the air to the third screen was 1½ cu. ft. per minute. The temperatures employed were about 450° C. at each screen.

The total oil feed was 14 liters, and the total product recovered was 8 liters, being a 57% recovery. There was 30% of aldehyde fatty acids in the product, which also contained about 45% of aldehydes.

Better results than the above run can be obtained if a larger proportion of the lighter fraction is employed; especially as a lower conversion temperature can then be used. Furthermore, while the heavier hydrocarbons are converted more easily than the lighter hydrocarbons, yet both are partially oxidized in this process.

I may take the product from this process, distil it up to about 300° C., and employ the distillate as a fuel for internal combustion engines. The remaining heavier portion in distilling up to 300° C. can be converted into greases, soaps, lubricants, etc.

The advantages of my invention will be obvious to those skilled in the art, since a process is afforded which is much easier to operate and more effective in the treatment of heavier fractions.

The apparatus employed may be varied and various changes may be made in the process without departing from my invention, since I consider myself the first to mix a heavier hydrocarbon with a lighter fraction and subject the mixture to a partial oxidation method.

I claim:

1. In the partial oxidation of heavier mineral hydrocarbons, the steps consisting in mixing a heavier fraction of a mineral hydrocarbon with a lighter fraction of a mineral hydrocarbon, vaporizing the mixture, and mixing it with oxygen and passing the vapor mixture through a reaction zone at a temperature within the partial oxidation range.

2. In the partial oxidation of heavier mineral hydrocarbons, the steps consisting in mixing a heavier fraction of a mineral hydrocarbon with a lighter fraction of a mineral hydrocarbon, vaporizing the mixture, and mixing it with oxygen and passing the vapor mixture through a reaction zone in contact with a catalyst at a temperature within the partial oxidation range.

In testimony whereof I have hereunto set my hand.

JOSEPH HIDY JAMES.